(12) United States Patent
Nilsson

(10) Patent No.: US 8,991,334 B2
(45) Date of Patent: Mar. 31, 2015

(54) ARRANGEMENT AND METHOD IN A MILKING SYSTEM, THE MILKING SYSTEM ITSELF, AND A COMPUTER PROGRAM PRODUCT FOR CONTROLLING THE METHOD

(75) Inventor: Mats Nilsson, Tumba (SE)

(73) Assignee: Delaval Holding AB, Tumba (SE)

( * ) Notice: Subject to any disclaimer, the term of this patent is extended or adjusted under 35 U.S.C. 154(b) by 670 days.

(21) Appl. No.: 13/381,755

(22) PCT Filed: Jun. 24, 2010

(86) PCT No.: PCT/EP2010/058999
§ 371 (c)(1),
(2), (4) Date: Dec. 30, 2011

(87) PCT Pub. No.: WO2011/000774
PCT Pub. Date: Jan. 6, 2011

(65) Prior Publication Data
US 2012/0103266 A1    May 3, 2012

(30) Foreign Application Priority Data
Jul. 1, 2009    (SE) ...................................... 0950513

(51) Int. Cl.
*A01K 1/12*    (2006.01)

(52) U.S. Cl.
CPC ...................................... *A01K 1/126* (2013.01)
USPC ..................................... 119/14.02; 119/14.03

(58) Field of Classification Search
CPC .......... A01K 15/04; A01K 1/12; A01K 1/126
USPC ............................. 119/14.02, 14.04, 840, 843
See application file for complete search history.

(56) References Cited

U.S. PATENT DOCUMENTS

| 3,835,814 A | 9/1974 | Jacobs et al. |
| 7,270,078 B2 | 9/2007 | Van Den Berg et al. |

(Continued)

FOREIGN PATENT DOCUMENTS

| EP | 1523882 | 4/2005 |
| FR | 2 757 742 | 7/1998 |

(Continued)

OTHER PUBLICATIONS

International Search Report dated Mar. 28, 2011, corresponding to PCT/EP2010/058999.

(Continued)

*Primary Examiner* — Rob Swiatek
*Assistant Examiner* — Ebony Evans
(74) *Attorney, Agent, or Firm* — Young & Thompson

(57) ABSTRACT

An arrangement in a rotary milking system includes a rotating platform, an entry thereto and an exit therefrom. A selection gate arrangement at the exit of the rotating platform selectively guides animals, which have been milked in the rotary milking system and leave the rotating platform through the exit, back to the entry of the rotating platform or to a waiting area. A control device is provided for (i) determining whether an animal, which has been milked and leaves the rotating platform through the exit, has at least one udder compartment that was incompletely milked the last time the animal was milked, and (ii) controlling the selection gate arrangement to guide the animal back to the entry of the rotating platform or to the waiting area provided that the animal has at least one udder compartment that was incompletely milked the last time the animal was milked.

20 Claims, 1 Drawing Sheet

(56) References Cited

U.S. PATENT DOCUMENTS

| | | | |
|---|---|---|---|
| 2008/0109266 A1 | 5/2008 | Bjork et al. | |
| 2009/0272325 A1* | 11/2009 | Sogaard et al. | 119/14.02 |
| 2010/0282172 A1* | 11/2010 | Eriksson et al. | 119/14.02 |
| 2011/0308465 A1* | 12/2011 | Siddell | 119/14.03 |
| 2012/0006269 A1* | 1/2012 | McCain et al. | 119/14.02 |
| 2013/0112143 A1* | 5/2013 | Mulder | 119/14.02 |

FOREIGN PATENT DOCUMENTS

| | | |
|---|---|---|
| SU | 649373 | 2/1979 |
| SU | 1777728 | 11/1992 |
| WO | 97/37530 | 10/1997 |
| WO | 98/53671 | 12/1998 |
| WO | 00/04764 | 2/2000 |
| WO | 00/74472 | 12/2000 |
| WO | 02/19806 | 3/2002 |
| WO | 2004/100650 | 11/2004 |

OTHER PUBLICATIONS

Supplementary International Search Report dated Jul. 21, 2011, corresponding to PCT/EP2010/058999.

Swedish Search Report dated Dec. 10, 2009, corresponding to the Foreign Priority Application No. 0950513-2.

* cited by examiner

ARRANGEMENT AND METHOD IN A MILKING SYSTEM, THE MILKING SYSTEM ITSELF, AND A COMPUTER PROGRAM PRODUCT FOR CONTROLLING THE METHOD

TECHNICAL FIELD OF THE INVENTION

The present invention relates generally to dairy farming and to milking of dairy animals therein.

DESCRIPTION OF RELATED ART AND BACKGROUND OF THE INVENTION

A rotary milking system comprises a rotating platform which animals enter and leave in a sequential order in order to be milked. The rotating platform comprises a plurality of milking stalls, each provided with milking equipment for milking of an animal present in the milking stall. The rotating platform rotates with the milking stalls and the animals which have entered the rotating platform, slowly while the animals are milked.

Sometimes the milking of an animal on the rotating platform is not complete, that is, it may happen that a cow that has been milked has an udder compartment that was incompletely milked. The incomplete milking may have been caused by a teat cup kick or fall off during milking. Incomplete milking may as well depend on a damaged or infected teat.

In a semi-automated or fully automated rotary milking system, teat cups of the milking equipments are automatically attached to the teats of the animals to be milked by a robot arm provided with a gripper. One single robot arm may serve all or at least several milking stalls of the rotary milking system. Incomplete milking in such rotary milking system may also be caused by a failed teat cup attachment, e.g. caused by a dirty camera lens or an unfavorable teat position.

FR 2 757 742 discloses a rotary milking system, wherein the problem of incomplete milking is discussed. If the milk quantity obtained is not proper, the animal is kept on the rotating platform for another revolution. When the animal passes the operator, he/she can verify that the milking claw is well in place. Should the milk quantity be too low also after a second revolution, the animal is evacuated and an alarm is sent to get the operator's attention.

SUMMARY OF THE INVENTION

However, it shall be appreciated that in some rotary milking system designs, it is not possible to allow the animal to stay on the rotating platform. Cleaning equipment or other equipment of the rotary milking system may occupy the space between the entry to and the exit from the rotating platform.

Further, it may not be pleasant to the animals to stay on the rotating platform with the teat cups attached for longer periods of time.

It is an object of the present invention to provide an arrangement and method in a rotary milking system, a rotary milking system including the arrangement, and a computer program product for controlling by which the above situation can be handled appropriately and efficiently and by which the drawbacks of the prior art can be avoided.

It is a further object of the invention to provide such arrangement and method, which are automated, accurate, reliable, of low cost, and easy to install.

These objects, among others, are attained by arrangements and methods as defined in the appended patent claims.

According to a first aspect of the invention an arrangement is provided in a rotary milking system, which comprises a rotating platform which rotates during milking, an entry thereto and an exit from there, and a plurality of milking equipments for milking animals thereon. The arrangement comprises a selection gate arrangement and a control device operatively connected to the selection gate arrangement. The selection gate arrangement is arranged at the exit of the rotating platform and is capable of selectively guiding animals, which have been milked in the rotary milking system and leave the rotating platform through the exit, back to the entry of the rotating platform or to a waiting area. The control device is arranged to (i) determine whether an animal, which has been milked and leaves the rotating platform through the exit, has at least one udder compartment that was incompletely milked the last time the animal was milked, and (ii) control the selection gate arrangement to guide the animal back to the entry of the rotating platform or to the waiting area provided that the animal has at least one udder compartment that was incompletely milked the last time the animal was milked.

By means of the present invention the overall milk production is optimized since the milking of an animal that follows an incomplete milking of that animal can be made more efficient and in a manner suitable to an automated or semi-automated rotary milking system.

The determination as to whether an animal that presents itself at the milking system has an udder compartment that was incompletely milked the last time the animal was milked can be made based on milk yields and/or milking times measured during the last milking.

Alternatively or additionally, the determination as to whether an animal that presents itself at the milking system has an udder compartment that was incompletely milked the last time the animal was milked is made based on the measurement(s) by one or several sensors, e.g. a vacuum sensor and/or a camera, capable of detecting teat cup kick-off and/or incorrect or failed teat cup attachment.

In one embodiment the above arrangement is implemented in a rotary milking system comprising a teat cup attachment device and a control device for controlling the teat cup attachment device to attach teat cups to teats of animals prior to milking the animals. The rotary milking system is preferably arranged to milk the animal again provided that the animal has at least one udder compartment that was incompletely milked the last time the animal was milked and has been guided back to the entry of the rotating platform, either directly or via the waiting area.

This subsequent or second milking can be performed while improving animal care, increasing the utilization of the milking system, and increasing milk production.

In one version of the above embodiment the rotary milking system is arranged to milk the animal again in a milking procedure which is different from the one in which the animal was milked the last time the animal was milked with respect to the procedure for the attachment of teat cups to, and/or detachment of teat cups from, the teats of the animal.

Hereby, the animal care and treatment can be improved by means of reducing the wear of the teats. Concurrently, the subsequent milking can be made more efficient and adapted to the needs whereupon the utilization of the rotary milking system and thus the milk production can be increased.

This may be achieved in several different manners. For instance, the rotary milking system may be arranged to milk the animal again by means of attaching a teat cup to, and milk, only the teat of the at least one udder compartment that was determined to be incompletely milked the last time the animal was milked.

Alternatively, the rotary milking system may be arranged to milk the animal again by means of (i) attaching teat cups to, and starting milking of, the teats of all the udder compartments of the animal; (ii) establishing during a short period of time in which of the teat cups a milk flow above a selected threshold is obtained; (iii) immediately after the expiry of the short period of time detaching the teat cups, in which a milk flow above the selected threshold is not obtained, from the teats, while keeping the other teat cups attached during the following milking.

According to a second aspect of the invention there is provided a method for controlling milking in a rotary milking system, which comprises a rotating platform which rotates during milking, an entry thereto and an exit from there, and a plurality of milking equipments for milking animals. According to the method it is determined whether an animal, which has been milked and leaves the rotating platform through the exit, has at least one udder compartment that was incompletely milked the last time the animal was milked. If the animal has at least one udder compartment that was incompletely milked the last time the animal was milked the animal is automatically guided back to the entry of the rotating platform or to a waiting area by means of an automated selection gate arrangement. The animal is then automatically allowed, enticed, or forced to enter the rotating platform again and is milked again.

Further characteristics of the invention and advantages thereof, will be evident from the detailed description of preferred embodiments of the present invention given hereinafter and the accompanying FIGS. 1-2, which are given by way of illustration only and are thus not limitative of the present invention.

DETAILED DESCRIPTION OF EMBODIMENTS

Figure 1:
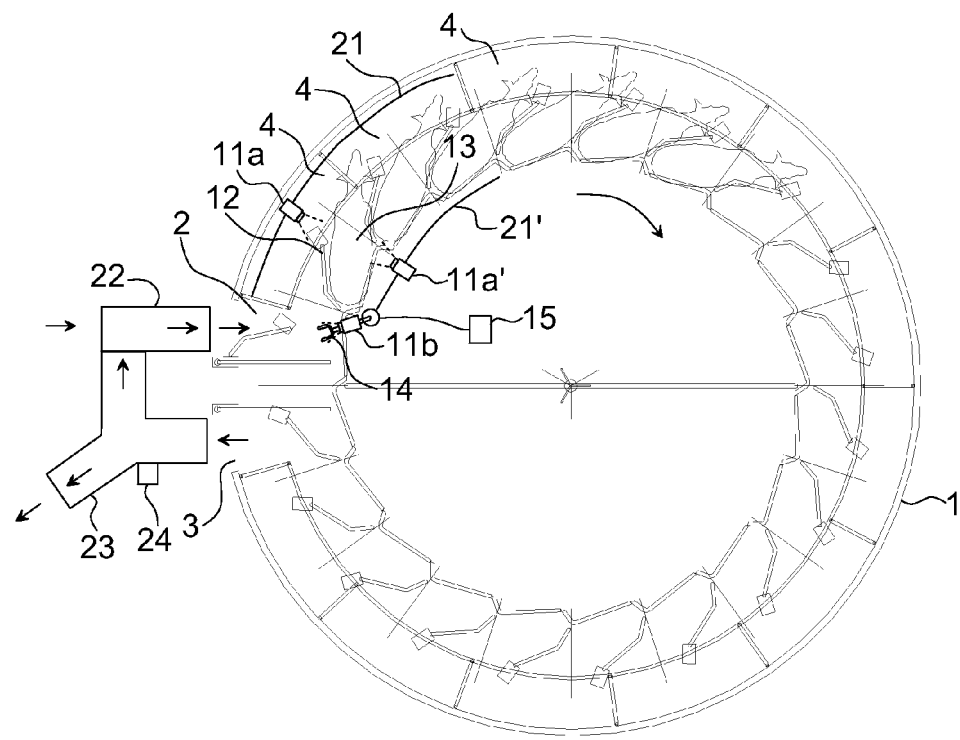
FIG. 1 illustrates schematically a rotary milking system in accordance with an embodiment of the invention.

FIG. 1 illustrates a schematically outlined semi-automated or automated rotary milking system provided for semi-automated or automated milking of animals. The rotary milking system comprises a rotating platform 1 which animals 13 enter and leave in a sequential order in order to be milked and which rotates during milking, an entry 2 to the rotating platform 1 for entry of animals to the rotating platform 1, and an exit 3 from the rotary milking system for allowing animals to leave the rotating platform 1 after milking. The rotating platform 1 is provided with a plurality of milking stalls 4, each being provided with respective milking equipment (not illustrated) for milking animals on the rotating platform 1 and each being provided to house a single animal 13 during milking. In front of the entry 2 there may be provided an entry box or an entry passageway 22 provided with an animal identification device, which is arranged to identify each of the animals that enter the rotary milking system, and optionally an automatic gate device.

While FIG. 1 shows a rotary milking system in herringbone configuration, the invention is applicable to other kind of configurations such as parallel and tandem configurations.

Further, the rotary milking system comprises an automatic teat cup attachment device or robot 14 and a control device 15 for controlling the teat cup attachment device to attach teat cups to teats of animals prior to milking the animals with aid from a camera arrangement including e.g. three camera systems 11a, 11a'', and 11b.

Two camera systems 11a, 11a' of the three-dimensional camera arrangement can be arranged to be movable along a respective path in the form of a rail 21, 21' or similar mounted e.g. in a ceiling of a building housing the rotary milking system. The movement of two camera systems 11a, 11a' can be locked to the movement, i.e. rotation, of the rotating platform 1 such that the two camera systems 11a, 11a' are stationary with respect to the rotating platform 1 when recording images of the teats of the animal 13 on the rotating platform 1. Alternatively, the two camera systems 11a, 11a' are stationary with respect to the rotating platform 1 during all times.

One camera system 11b is mounted on an arm of the teat cup attachment device 14.

The rotating platform 1 may, for each of the animals, be kept still while the teat cup attachment device 14 automatically attaches teat cups to the teats of the animal, and is rotated there in between, but preferably the rotating platform 1 is rotated continuously during the attachment of the teat cups and the milking of the animals.

When the teat cups have been attached to the teats of an animal on the rotating platform 1 the two camera systems 11a, 11a' are moved in an opposite direction with respect to the direction of movement of the rotating platform 1 such that the two camera systems 11a, 11a' will be aligned for use in a next one of the milking stalls, when again the two camera systems 11a, 11a' are locked to the rotating platform.

It shall be appreciated that the rotary milking system may be provided with other kinds of visual teat sensing devices. For instance, the two camera systems 11a, 11a' may be dispensed with and a sole visual teat sensing device, mounted on the arm of the teat cup attachment device or elsewhere, is used to locate the teats of the animal during the teat attachment procedure. Further, the rotary milking system may be provided with more than one teat cup attachment device such that teat cups can be attached to the teats of several animals simultaneously.

The rotary milking system comprises a central control and process apparatus (not illustrated) for controlling various parts of the rotary milking system 1 such as the movement of the rotating platform 1 and the operation of the milking equipment of the milking stalls 4, and for gathering information such as milk yields and milking times for each of the milking animals 13.

Sometimes the milking is not complete, that is, milking is terminated and the animal is allowed to leave the milking system despite that an udder compartment is not completely emptied. This may happen after a teat cup kick or fall off. Conditions for when re-attachment of a teat cup to, and restarting the milking of, a teat, in case of a teat cup kick or fall off, are disclosed in WO2004/100650, the contents of which being hereby incorporated by reference. If such conditions are not met the udder compartment is left incompletely milked as the animal is allowed leave the milking system after milking.

In accordance with an aspect of the present invention there is provided a selection gate arrangement 23 at the exit 3 of the rotating platform which is capable of selectively guiding animals, which have been milked in the rotary milking system and leave the rotating platform 1 through the exit 3, back to the entry 2 of the rotating platform via the entry box or entry passageway 22, or elsewhere such as to a pasture or loose house environment. The selection gate arrangement 23 comprises two automatic exit gate devices and optionally an automatic entry gate device.

Further, a control device 24 is operatively connected to the selection gate arrangement 23 and is provided for (i) determining whether an animal, which has been milked and leaves the rotating platform 1 through the exit 3, has at least one udder compartment that was incompletely milked the last time the animal was milked, and (ii) controlling the selection gate arrangement 23 to guide the animal back to the entry 2 of the rotating platform 1 via the entry box or entry passageway 22 provided that the animal has at least one udder compartment that was incompletely milked the last time the animal was milked. If not, the control device 24 controls the selection gate arrangement 23 to guide the animal elsewhere.

The control device 24 is provided for determining that the animal has an udder compartment that was incompletely milked the last time the animal was milked if the milk yield from that animal or that udder compartment (if this was measured individually) was below a first threshold value the last time the animal was milked and/or if the milking time for that animal or that udder compartment (if this was measured individually) was below a second threshold value the last time the animal was milked.

Alternatively or additionally, one or several sensors, e.g. a vacuum sensor and/or a camera (not illustrated), is/are arranged to detect e.g. teat cup kick-off and/or incorrect or failed teat cup attachment and to provide the control device 24 with such information, by aid of which the control device 24 determines whether an animal that presents itself at the milking system has an udder compartment that was incompletely milked the last time the animal was milked.

The first and second threshold values may be values independent of the animal or values dependent on the animal, preferably percentage values of an expected milk yield for the animal or for the udder compartment of the animal.

Each animal that is guided back to the entry 2 of the rotating platform 1 is allowed or guided onto the rotating platform 1 and is milked again. Preferably, for each of the animals, this subsequent milking is performed in a milking procedure which is different from the one in which the animal was milked the last time the animal was milked with respect to the procedure for the attachment of teat cups to, and/or detachment of teat cups from, the teats of the animal in order to reduce the wear of the teats of the animal.

For instance, the subsequent milking may be performed, for each of the animals, by means of attaching a teat cup to, and milking, only the teat of the at least one udder compartment that was determined to be incompletely milked the last time the animal was milked.

Hereby, the milking procedure including the automatic teat cup attachment is performed faster and the wear on the teats of the animal is reduced.

Alternatively, the subsequent milking may be performed, for each of the animals, by means of (i) attaching teat cups to, and starting milking of, the teats of all the udder compartments of the animal; (ii) establishing during a short period of time, e.g. less than about 30 seconds, preferably less than about 15 or 20 seconds, in which of the teat cups a milk flow above a selected threshold is obtained; and (iii) immediately after the expiry of the short period of time detaching the teat cups, in which a milk flow above the selected threshold is not obtained, from the teats, while keeping the other teat cups attached during the following milking.

Also in this version, the milking procedure including the automatic teat cup attachment is performed faster and the wear on the teats of the animal is reduced since teat cups will not be detached after such a short time in a regular milking procedure. This embodiment is particularly suitable when it is not generally known which of the udder compartments that was/were incompletely milked the last time the animal was milked.

Figure 2:
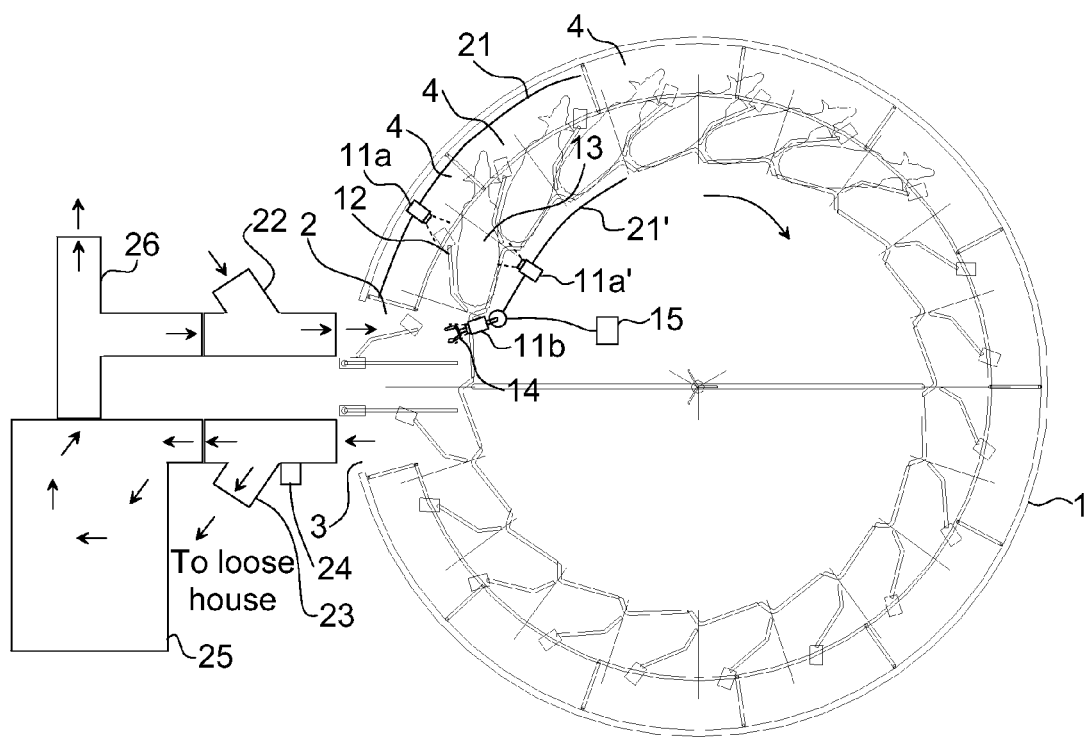
FIG. 2 illustrates schematically a rotary milking system in accordance with a further embodiment of the invention.

FIG. 2 illustrates schematically a rotary milking system in accordance with a further embodiment of the invention. This embodiment differs from the embodiment of FIG. 1 in that the selection gate arrangement 23 leads to a waiting area 25 and elsewhere, and in that there is provided a further selection gate arrangement 26 capable of directing animals in the waiting area 25 to the entry 2 of the rotating platform via the entry box or entry passageway 22 or elsewhere such as to a pasture or loose house environment or to a treatment station. The further selection gate arrangement 26 comprises two automatic exit gate devices and optionally an automatic entry gate device.

The control device 24 of FIG. 2 is arranged to (i) determine whether an animal, which has been milked and leaves the rotating platform 1 through the exit 3, has at least one udder compartment that was incompletely milked the last time the animal was milked, and (ii) control the selection gate arrangement 23 of FIG. 2 to guide the animal to waiting area 25 provided that the animal has at least one udder compartment that was incompletely milked the last time the animal was milked. If not, the control device 24 controls the selection gate arrangement 23 to guide the animal elsewhere.

The waiting area 25 may be arranged to hold animals for a time period, after which the animals in the waiting area 25 may, one at a time, be allowed to enter the further selection gate arrangement 26. Preferably, each of the animals in the waiting area 25 is guided, one at a time, to enter the rotary milking system so as to be milked in accordance with the description with reference to FIG. 1. However, some of the animals in the waiting area 25 may be guided elsewhere such as to a pasture or loose house environment or to a treatment station.

Preferably, the embodiment of FIG. 2 is implemented in a rotary milking system wherein animals are milked batch wise. In such instance, the animals in the waiting area 25 are milked after the batch of animals has been milked in the rotary milking system. Alternatively, the rotary milking system is provided to allow or guide the animals to enter the rotating platform 1 in an order of the expected milking time, such that e.g. the animal having longest expected milking time is allowed or guided to enter the rotating platform first, the animal having second longest expected milking time is allowed or guided to enter the rotating platform as second animal, etc., wherein the rotational speed is increasing continuously or stepwise to adapt to a shorter and shorter milking time. In such milking system the animals having at least one udder compartment that was incompletely milked the last time the animals were milked are allowed or guided to enter the milking platform 1 after the animal having shortest expected milking time is allowed or guided to enter the rotating platform 1.

The arrows at and to the left of the entry 2 to and exit 3 from the rotating platform 1 in FIGS. 1 and 2 indicate the traffic pattern of animals. The arrows within the rotating platforms indicate the rotation directions of the rotating platforms.

While the present invention has been described in a variety of embodiments it is obvious that they can be modified in a variety of more versions without departing from the scope of the present invention.

The invention claimed is:

1. An arrangement of a rotary milking system comprised of a rotating platform (1) which rotates during milking; an entry (2) to the rotating platform (1), the entry (2) providing for sequential entry of animals (13) to be milked on the rotating platform (1) using a first milking procedure; plural milking stalls (4) on said rotating platform, each milking stall (4) for housing a single one of the milking animals (13) during the milking; an exit (3) from the rotating platform (1), the exit (3) allowing the animals (13) to leave the rotating platform (1) after the milking, the arrangement comprising:
   an enclosed selection gate arrangement (23) located at the exit (3) from the rotation platform (1) so that each of the animals leaving the rotating platform through the exit enter into the selection gate arrangement (23),
   the selection gate arrangement (23) comprising a first exit gate and a second exit gate,
   the first exit gate connected to the entry of the rotating platform (1) so that animals guided through the first exit gate are guided back to the entry of the rotating platform (1); and
   a control device (15, 24) operatively connected to the selection gate arrangement (23) and configured to
   (i) determine whether each animal, which has been milked and enters the selection gate arrangement (23) through the exit (3), has at least one udder compartment that was incompletely milked the last time the animal was milked, and
   (ii) control the selection gate arrangement to guide the animal through one of i) the first exit gate back to the entry of the rotating platform, when the determination is that the animal has at least one udder compartment that was incompletely milked the last time the animal was milked, and ii) the second gate.

2. The arrangement of claim 1, further comprising:
   an enclosed waiting area (25) having an entry connected to the first exit gate of the selection gate arrangement (23) so that the animals guided through the first exit gate enter into the waiting area (25) and are held in the waiting area (25), the waiting area (25) having an exit connected to the entry (2) to the rotating platform (1),
   the control device (15, 24) controlling the selection gate arrangement and the waiting area (25) to guide the animal through the first exit gate back to the entry (3) of said rotating platform via the waiting area (25) when the determination is that the animal has at least one udder compartment that was incompletely milked the last time the animal was milked.

3. The arrangement of claim 2, wherein the second gate exits to one of a loose house and a pasture.

4. The arrangement of claim 1, wherein said control device determines that said animal has an udder compartment that was incompletely milked the last time the animal was milked when one of i) milk yield from that animal, and ii) milk yield from that udder compartment, was below a first threshold value the last time the animal was milked.

5. The arrangement of claim 4, wherein the first threshold value is a value dependent on said animal, expressed as one of i) a percentage value of an expected milk yield for said animal, and ii) a percentage value of an expected milk yield for the udder compartment of said animal.

6. The arrangement of claim 4, wherein said control device determines that said animal has an udder compartment that was incompletely milked the last time the animal was milked when one of i) a milking time for that animal, and ii) the milking time for that udder compartment, was below a second threshold value the last time the animal was milked.

7. The arrangement of claim 6, wherein the second threshold value is a value dependent on said animal, expressed as one of i) a percentage value of an expected milking time for said animal, and ii) a percentage value of an expected milking time for the udder compartment of the animal.

8. The arrangement of claim 1, wherein said control device determines that said animal has an udder compartment that was incompletely milked the last time the animal was milked when one of i) a milking time for that animal, and ii) the milking time for that udder compartment, was below a threshold value the last time the animal was milked.

9. The arrangement of claim 8, wherein the threshold value is a value dependent on said animal, expressed as one of i) a percentage value of an expected milking time for said animal and ii) a percentage value of an expected milking time for the udder compartment of the animal.

10. The arrangement of claim 1, wherein said control device, for the animal having the at least one udder compartment that was incompletely milked the last time the animal was milked and that is guided back to the entry of said rotating platform, controls the milking to use a second milking procedure different from the first milking procedure.

11. The arrangement of claim 10, wherein the first and second milking procedures differ as to one of i) attachment of teat cups to teats of the animal, and ii) detachment of the teat cups from the teats of the animal.

12. The arrangement of claim 10, wherein the control device executes the second milking procedure so that only the teat of the at least one udder compartment that was determined to be incompletely milked the last time the animal was milked is milked during the second milking procedure.

13. The arrangement of claim 1, further comprising:
   a sensor arranged and configured to sense a parameter related to the milking of the animal indicating one of i) a teat cup kick-off and ii) an incorrect or failed teat cup attachment,
   the sensor operatively connected to said control device,
   wherein said control device determines whether said animal, which has been milked and leaves the rotating platform through the exit, has at least one udder compartment that was incompletely milked the last time the animal was milked based on the sensing of said sensor.

14. A method for controlling milking in a rotary milking system comprising a rotating platform (1) which rotates during milking, an entry (2) thereto and an exit (3) therefrom, and a plurality of milking stalls for milking animals (13) on the rotating platform, the method comprising the sequential steps of:
   bringing an animal, which has been milked, into an enclosed selection area (23) as the animal leaves the rotating platform through the exit, the selection area (23) including a first exit gate and a second exit gate, the first exit gate leading back to the entry of the rotating platform;
   determining whether the animal has at least one udder compartment that was incompletely milked the last time the animal was milked;
   guiding the animal to one of i) back to the entry of the rotating platform, and ii) to another area,
   the guiding by selectively opening one of the first and second exit gates, the first exit gate being opened when the determining step determines that the animal has at least one udder compartment that was incompletely milked the last time the animal was milked; and
   milking the animal again when the animal has been guided back to the entry of said rotating platform.

15. The method of claim 14, wherein said guiding step guides the animal back to the entry of said rotating platform via the first exit gate and via an enclosed waiting area (25).

16. The method of claim 14, wherein in said milking again step, the animal is milked in a milking procedure different from a previous milking procedure used when the animal was last milked.

17. The method of claim 14, wherein the animal is milked again by (i) attaching teat cups to, and starting milking of, the teats of all the udder compartments of the animal; (ii) establishing during a period of time in which of the teat cups a milk flow above a selected threshold is obtained; and (iii) immediately after the expiry of the period of time detaching the teat cups, in which a milk flow above the selected threshold is not obtained, from the teats, while keeping the other teat cups attached during the following milking.

18. A nontransitory tangible computer readable storage medium containing a computer program product loadable into internal memory of a computer of a milking system, said computer program product comprising software code portions for controlling the computer to execute the method of claim 14.

19. A rotary milking system comprising the arrangement of claim 1.

20. The rotary milking system of claim 19, further comprising a teat cup attachment device (14) operative under control of the control device (15) for controlling the teat cup attachment device to attach teat cups to teats of animals prior to milking the animals.

* * * * *